United States Patent
Brereton et al.

(10) Patent No.: US 7,593,198 B2
(45) Date of Patent: Sep. 22, 2009

(54) RELAY CIRCUIT

(75) Inventors: Richard Peter Brereton, Bournemouth (GB); Duncan Hamilton, Ferndown (GB); Daniel Robert Rees, Bournemouth (GB)

(73) Assignee: P G Drives Technology Ltd., Christchurch, Dorset (GB)

( * ) Notice: Subject to any disclaimer, the term of this patent is extended or adjusted under 35 U.S.C. 154(b) by 0 days.

(21) Appl. No.: 11/798,780

(22) Filed: May 16, 2007

(65) Prior Publication Data
US 2007/0268640 A1 Nov. 22, 2007

(30) Foreign Application Priority Data
May 16, 2006 (GB) .................................... 0609634

(51) Int. Cl.
*H02H 3/00* (2006.01)
*H02H 7/00* (2006.01)
(52) U.S. Cl. ..................... 361/8; 361/2; 361/7
(58) Field of Classification Search ........................ None
See application file for complete search history.

(56) References Cited

U.S. PATENT DOCUMENTS 5,991,505 A 11/1999 Frank
6,201,678 B1 * 3/2001 Kolbas et al. ............... 361/93.5
2005/0151515 A1 * 7/2005 Isurin et al. ................. 322/28

FOREIGN PATENT DOCUMENTS

GB 1 304 158 1/1973
GB 2 120 477 A 11/1983

OTHER PUBLICATIONS

Great Britain Search Report for corresponding GB Patent Appln 0609634.1, dated Aug. 29, 2006 (1 page).

* cited by examiner

*Primary Examiner*—Albert W Paladini
*Assistant Examiner*—Dharti Patel
(74) *Attorney, Agent, or Firm*—Nixon & Vanderhye P.C.

(57) ABSTRACT

A switching circuit for connecting a power source to a load is described. The circuit comprises a first relay and at least one second relay in parallel arrangement with the first relay. The switching circuit is arranged such that in the event of a fault condition occurring that requires the disconnection of the power source from the load, the at least one second relay opens while the first relay remains closed. In this manner, a reliable disconnection of the load from the switching circuit is achieved.

11 Claims, 4 Drawing Sheets

RELAY CIRCUIT

CROSS REFERENCE TO PRIORITY APPLICATION

This application claims the benefit of UK Application No. 0609634.1 filed 16 May 2006, incorporated herein by reference in its entirety.

BACKGROUND OF THE INVENTION

The present invention is concerned with electronic switching circuits comprising electromechanical relays and particularly but not exclusively to switching circuits for isolating electrical loads in the event of a fault.

Electromechanical relays are a very mature technology. Despite being replaced by semiconductor devices in many applications, the basic relay still retains many advantages over modern switching systems providing an inherently low voltage drop and good electrical isolation.

The lifetime of the electrical contacts of relays is usually the limiting factor in determining their usefulness in modern circuits. This is especially true for direct current (DC) applications where contact erosion takes place. The rated useful life of the relay contacts is often only 1% of the mechanical life, especially where loads which are controlled are inductive e.g. motor, or have a high in-rush current e.g. tungsten lamps.

Relays are still widely used in automotive applications as the system voltage for automobiles is relatively low e.g. 12V. At higher voltages, the material from which the relay contacts are made behave differently and contact erosion through arcing during the opening and closing of the contacts becomes significant.

At higher voltages, for example 36-48V, the ability of a relay to break a high current resulting from an electronic switch failure becomes a problem as the voltage across the contacts, which is sufficient to start and sustain an arc, can fuse the contacts together, resulting in an uncontrolled and unreliable disconnection. This can be particularly problematic in applications wherein the safety of a user is compromised. For example, if the voltage source is a battery in a powered vehicle such as a wheelchair or golf cart. Accordingly, there is a requirement to reliably disconnect the supply voltage from a load under conditions of voltage and/or current failures.

SUMMARY OF THE INVENTION

In accordance with this invention as seen from a first aspect there is provided a switching circuit for connecting a power source to a load, the circuit comprising a first relay and at least one second relay in parallel arrangement with said first relay, the switching circuit arranged such that in the event of a fault condition occurring that requires the disconnection of the power source from the load, said at least one second relay opens while the first relay remains closed.

Preferably, a current sensitive circuit breaker is placed in series arrangement with said first relay, such that if said first relay does not open, said current sensitive circuit breaker will open the circuit.

Preferably, said circuit further comprises a timing circuit to open said at least one second relay before said first relay.

The switching circuit comprises a main isolation relay that is protected by a protective relay, which has a fuse in series therewith. The coil of the protective relay is driven using separate circuitry, which not only allows the protective relay to be closed separately to test its closure, but also ensures that it always opens after the main relay, even in the event of a failure.

In the event of a high current failure, requiring the main circuit to be broken, the delay in the protective relay opening allows the main relay to open without significant voltage across the contacts of the main relay, so minimising any arcing. When the contacts of the main relay open, the current will be diverted to the protective relay. Even if the protective relay then fails to open, for example if arcing welds the relay shut, the fuse will blow thereby providing a reliable, controlled disconnection. The loss of the fuse is then a sure indication that there is a fault with the switching device which will require repair.

The first and second relays comprise respective coils which are preferably powered using a pulse width modulated signal.

Preferably, the circuit further comprises a capacitor that is charged before said first relay closes, in order to reduce the voltage drop across said first relay to prevent arcing.

Preferably, the capacitor is charged using a pre-charge circuit.

Preferably, the timing circuit comprises a first diode and a second diode, wherein the first diode is connected across the coil of said at least one second relay to the power source and the second diode is connected across the coil of said first relay, to ensure that said at least one second relay opens before said first relay.

In accordance with this invention as seen from a second aspect there is provided a powered vehicle controller comprising a switching circuit in accordance with the first aspect.

In accordance with this invention as seen from a third aspect there is provided a method of isolating an electrical load from a power source using a switching circuit arranged between the power source and the load, the switching circuit comprising a first relay and at least one second relay in parallel arrangement with said first relay, said method comprising the steps of opening said at least one second relay while said first relay remains closed, in the event of a fault condition occurring.

Preferably, the method comprises causing a current sensitive circuit breaker arranged in series arrangement with said first relay, to open in the event that said first relay does not open.

BRIEF DESCRIPTION OF THE DRAWINGS

A description of the preferred embodiment of this invention will now be given by way of example only and with reference to the accompanying drawings, in which.

DETAILED DESCRIPTION OF ILLUSTRATED EMBODIMENTS

Figure 1:
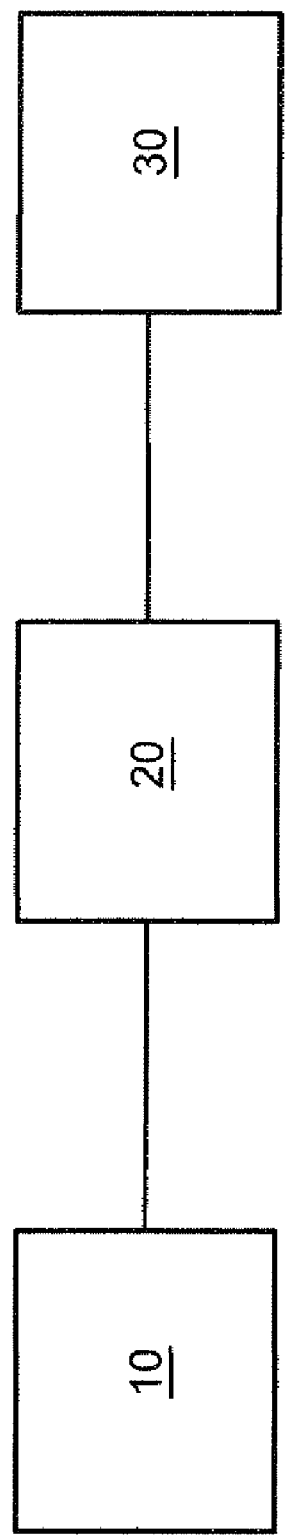
FIG. 1 is a block diagram illustrating the main components of the drive circuit to the load.

FIG. 1 illustrates the main components of a drive circuit for a battery powered vehicle, for example, a wheelchair. A battery supply 10, for example a 48V supply, is used to drive a wheelchair motor 30 via a switching circuit 20. In the event of an electrical fault it is necessary to reliably isolate the supply 10 from the motor 30 to prevent an unsafe condition from occurring.

Figure 2:
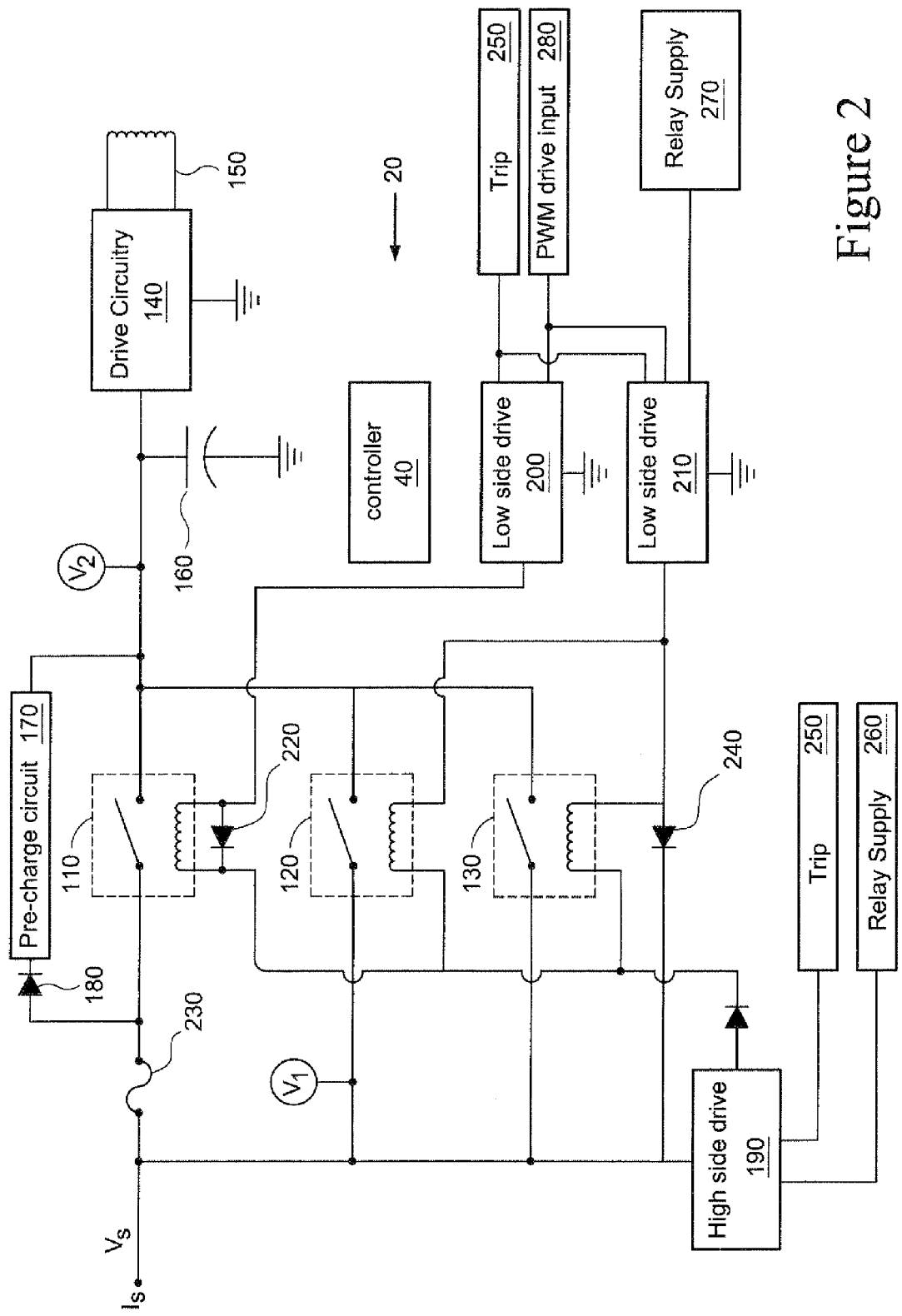
FIG. 2 is a circuit diagram of the switching circuit shown as block in FIG. 1.

The switching circuit 20 is shown in more detail in FIG. 2. The circuit 20 comprises a voltage supply Vs from the battery 10, a protective relay 110, first and second isolation relays 120, 130, and electronic drive circuitry 140 for a load 150, which in this example comprises the windings of the motors for the wheelchair.

The electronic drive circuitry 140 comprises a full or half bridge motor drive circuit (not shown) that is for driving the load 150 and is controlled by the protective relay 110 and the first and second relays 120, 130. The protective relay 110 and the first and second isolation relays 120, 130 are for connecting and disconnecting the battery supply Vs to the load 150 via the electronic drive circuit 140.

In normal operation, to supply power to the load 150 in an "ON" condition, the three relays 110, 120, 130 are all closed. Conversely, in an "OFF" condition when no power is to be supplied to the load 150, the relays 110, 120, 130 are open. As will be explained in more detail below, if an electrical fault is detected by the controller 40 in the full or half bridge drive during the "ON" condition, which leaves uncontrolled power applied to the load, the switching circuit is controlled so that the first and second isolation relays 120, 130 open prior to the protective relay 110.

Advantageously, a capacitor 160 is arranged in series arrangement with the drive circuitry 140 and is charged using a pre-charging circuit 170, before the relays 110, 120, 130 close to place the load in the "ON" condition. The pre-charge circuit 170 has a series diode 180 to protect against incorrect supply connection and this means that the capacitor 160 charges to within approximately 1V of the supply voltage Vs. By charging the capacitor prior to closure of the relay contacts, the voltage difference across the relays is minimised and this voltage difference (|Vs−V2|<1V) is insufficient to cause any contact arcing on closure. Accordingly, the relay contacts of the relays are not exposed to the large surge currents and potential welding which would occur as the contacts close.

Figure 3:
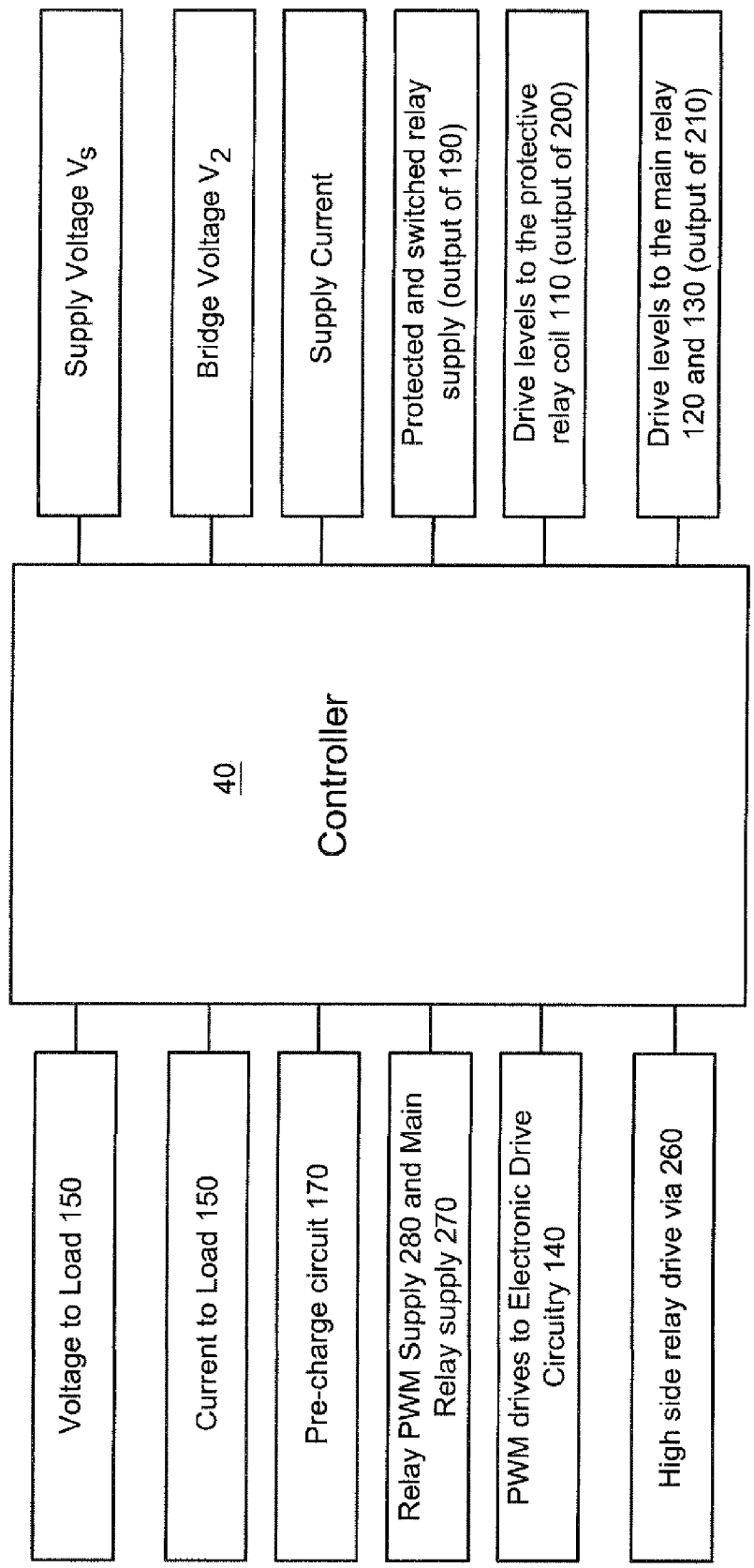
FIG. 3 is a schematic view illustrating sample connections between a controller and various components, relays, etc.
Figure 4:
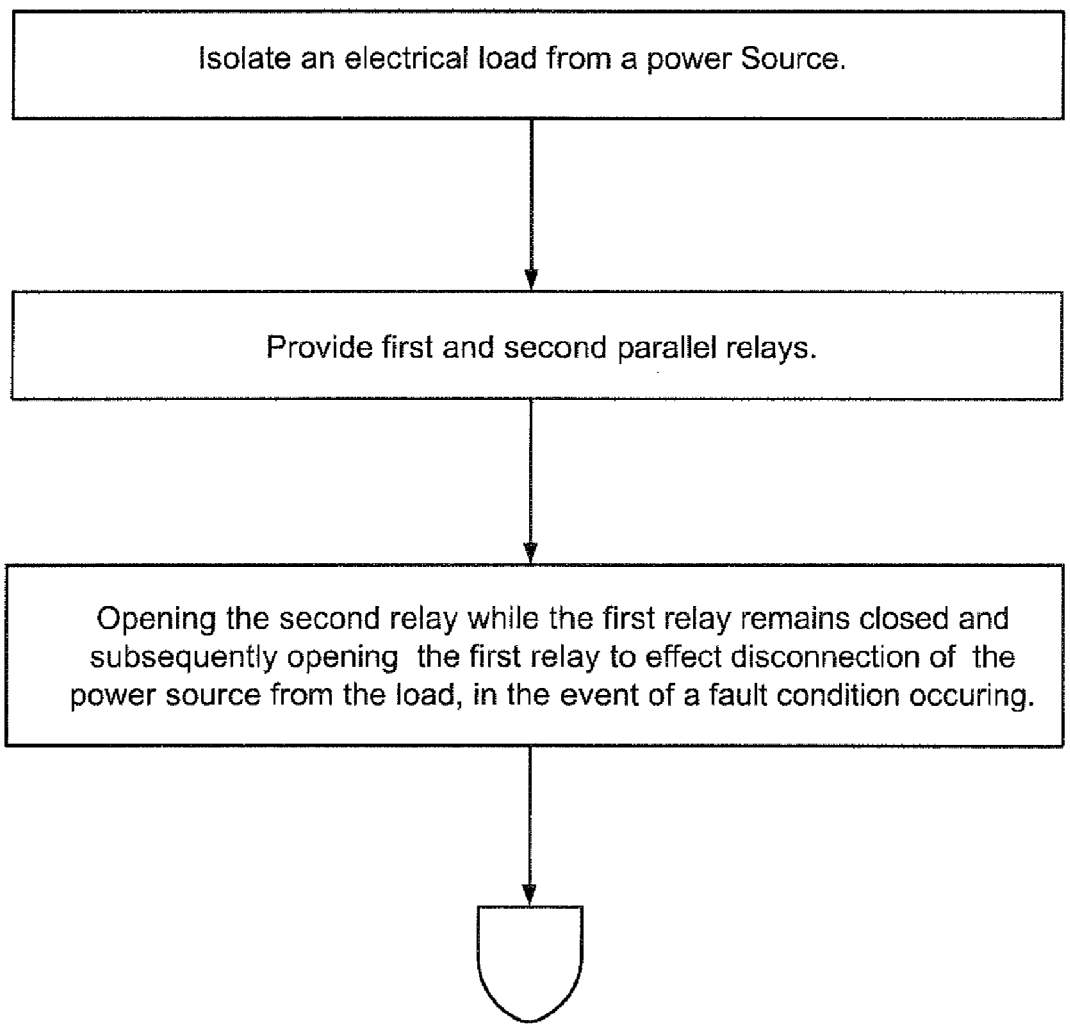
FIG. 4 is a sample flow chart for operating a circuit in the event a fault condition occurs.

A controller 40 monitors the voltage across the contacts of the relays and ensures that the capacitor 160 is correctly charged prior to the closure of the contacts of the relays. FIG. 3 is a schematic view showing sample connections between controller 40 and the other various components of the circuit. If the voltage drop across the protective relay 110 is less than 1V, the contacts of this relay can be closed. The closure can then be checked (Vs=V2) to ensure that the protective relay 110 is always closed before the contacts of the first and second isolation relays 120, 130 are closed.

The protective relay 110 and first and second isolation relays 120, 130 are driven from a high side supply 190. In addition, the coil of the protective relay 110 and the first and second isolation relays 120, 130 are separately driven by low side drives 200, 210, respectively. This ensures that they cannot be left active in the event of a node failure. In situations whereby the supply voltage Vs is higher than the rated coil voltage of the relays, the effective coil voltage can be reduced by a pulse width modulated (PWM) drive input 280.

Both the high side drive 190 and low side drive 200, 210 are interlocked by a hardware trip 250 that monitors the main controller 40, and are separately activated by on/off controls 260, 270 respectively. In the event of a high current failure requiring the voltage supply to the load 150 to be broken, the delay in the protective relay 110 opening allows the contacts of the first and second isolation relays 120, 130 to open. Subsequently, if the protective relay 110 fails to open, a fuse 230 placed in series with the protective relay 110, will blow, isolating the electrical load 150 from the electrical supply Vs.

The timing of the opening of the relay contacts is important to ensure that the voltage supply Vs is reliably disconnected from the load 150. When in the "ON" condition, current is supplied to the load via the three relays 110, 120, 130, and therefore is divided between each relay. When a fault occurs, the high side drive input 190 and the low side drives 200, 210 to the coils of the relays are terminated. However, the delay in the contacts of the protective relay 110 from opening allows the contacts of the first and second isolation relays 120, 130 to reliably open since there is insufficient voltage across the contacts of the first and second isolation relays 120, 130 to cause arcing and therefore weld the contacts together. However, once the contacts of the first and second isolation relays 120, 130 open, all of the current will then be diverted through the contacts of the protective relay 110. In some circumstances, this increase in current through these contacts may be sufficient to cause these contact to weld shut. Accordingly, in the event that the contacts to the protective relay 110 do not open, the fuse 230 will blow to reliably disconnect the supply voltage Vs from the load 150. To ensure that the main relays 120, 130 open before the protective relay 110, a first diode 240 is connected across the coils of the main relays 120, 130 to the battery side of the high side supply 190. A second diode 220 is connected directly across the coil of the protective relay 110 and clamps the reverse voltage across the coil.

The first diode 240 is connected to the battery side of the high side supply 190 so that when the driver circuit 190 switches off, there is in effect a much higher reverse voltage across the coils of the first and second isolation relays 120, 130 than the coil of the protective relay 110.

The rate of change of current (di/dt) in the coils of the relays is proportional to the voltage across them and so the current in the first and second isolation relays 120, 130 collapses more rapidly than the current in the coil of the protective relay 110, since the voltage drop across the coil of the protective relay 110 is comparatively low. The coil of the protective relay 110 can also be controlled separately if a more defined opening delay period is required.

The activation sequence for the relays 110, 120, 130, is controlled by the controller 40 and involves seven different states of operation, as shown in table 1. Progression to each successive state is only achieved if the previous state provides a positive test result.

The first state comprises the situation in which the system is first switched on and in this state the system is arranged to take up a predefined TRIP condition 250, so that an interlock for the high side relay supply 190 can be tested. The test is performed by attempting to drive the relay supply 190 and checking that it remains inactive. Similarly, the second state tests the low side drives 200, 210 to ensure that these drives are made inactive by a TRIP condition 250. At state three the TRIP condition 250 is withdrawn and the relay drives 190, 200, 210 are tested for being off.

Upon progressing to state four, the high side relay supply 190 is enabled and checked, and the controller 40 also checks that the capacitor 160 is suitably charged to within 0.5-1V of the battery voltage, Vs. The protective relay is then enabled and tested for contact closure (V2=Vs) at state five.

Finally, at state six the main relays 120, 130 are enabled and checked for correct active drive. The controller 40 monitors the high and low side drive voltages and ensures that there are no relay drive faults.

State seven comprises the situation in which a fault has occurred. In this state, both the high side drive 190 and low side drives 200, 210 to the coil of each relay is removed causing the current in the coils of the main relays 120, 130 to decay rapidly to open the contacts of the main relays 120, 130. The current in the protective relay is allowed to re-circulate more easily and decay slowly via a parallel diode and therefore takes longer to open, typically 10 ms, as compared with 2.5 ms for the contacts of the main relays 120, 130. In the event that the contacts of the protective relay 110 fail to open, the fuse 230 will blow thereby reliably isolating the battery supply voltage Vs from the drive circuit 30.

Motorised vehicles such as electric wheelchairs and golf carts use higher voltage battery supplies for operation. In these circumstances, it is essential that safe, reliable control of the vehicle is maintained at all times. Accordingly, it is envisioned that switching circuits in accordance with the present invention will find suitable applications in such vehicles.

TABLE 1

| State | TRIP (250) | Relay Supply (260) | Relay PWM supply (280) | Main Relay supply (270) | Controller Function (40) |
|---|---|---|---|---|---|
| 1 | 0 | 1 | 0 | 0 | Check high side relay supply (190) - TRIP override. |
| 2 | 0 | 0 | 1 | 1 | Check low side relay supply (200, 210) - TRIP override. |
| 3 | 1 | 0 | 0 | 0 | Release TRIP and check relay drives (190, 200, 210) for inactivity. |
| 4 | 1 | 1 | 0 | 0 | Enable relay supply; check potential of capacitor (160) |
| 5 | 1 | 1 | 1 | 0 | Enable protective relay 110 and check for contact closure. |
| 6 | 1 | 1 | 1 | 1 | Enable main relays (120, 130). System now active. |
| 7 | 0 | X | X | X | TRIP condition indicating an electrical fault. Relays open synchronously. |

The invention claimed is:

1. A switching circuit for connecting a power source to a load, the circuit comprising a first relay and at least one second relay in parallel arrangement with said first relay arranged such that in the normal "ON" state the first relay and the at least one second relay are in the closed position and the current from the power source propagates along the first and at least one second relay to the load, the circuit further comprising a current/voltage fault detecting system for identifying a fault condition in the event of the current to the load exceeding a predetermined threshold, the switching circuit arranged such that in the event of a fault condition occurring that requires the disconnection of the power source from the load, said at least one second relay opens prior to the first relay such that all the current passes through the first relay, and that said first relay subsequently opens to effect the normal "OFF" state causing disconnection of the power source from the load.

2. A switching circuit as claimed in claim 1, wherein the opening of said first relay is delayed such that the at least one second relay opens before the first relay.

3. A switching circuit as claimed in claim 2, wherein a current sensitive circuit breaker or fuse is placed in series arrangement with said first relay, such that if said first relay does not open, said current sensitive circuit breaker can open the circuit.

4. A switching circuit as claimed in claim 1, wherein said circuit further comprises a timing circuit to open said at least one second relay before said first relay.

5. A switching circuit as claimed in claim 1, wherein said first and second relays comprise respective coils that are powered using a pulse width modulated signal.

6. A switching circuit as claimed in claim 1, said circuit further comprising a capacitor that is charged before said first relay closes, in order to reduce the voltage drop across said first relay to prevent arcing.

7. A switching circuit as claimed in claim 6, wherein said capacitor is charged using a pre-charge circuit.

8. A switching circuit as claimed in claim 5, wherein said timing circuit comprises a first diode and a second diode, wherein the first diode is connected across the coil of said at least one second relay to the power source, and the second diode is connected across the coil of said first relay, to ensure that said at least one second relay opens before said first relay.

9. A powered vehicle controller comprising a switching circuit as claimed in claim 1.

10. A method of isolating an electrical load from a power source using a switching circuit arranged between the power source and the load, the switching circuit comprising a first relay and at least one second relay in parallel arrangement with said first relay arranged in such that in the normal "ON" state the first relay and the at least one second relay are in the closed position and the current from the power source propagates along the first and at least one second relay to the load, said method comprising the steps of opening said at least one second relay prior to the opening the first relay such that all the current passes through the first relay, and subsequently opening said first relay to effect disconnection of the power source from the load, to effect the "OFF" state in the event of a fault condition occurring.

11. A method of isolating an electrical load as claimed in claim 10, wherein said method comprises causing a current sensitive circuit breaker or fuse arranged in series arrangement with said first relay, to open in the event that said first relay does not open.

* * * * *